United States Patent [19]

Gandini

[11] 4,131,362
[45] Dec. 26, 1978

[54] LIGHT-MIXING COMPARTMENT FOR A LIGHT PROJECTOR

[75] Inventor: Mario Gandini, Brixen, Italy

[73] Assignee: DURST AG Fabrik Fototechnischer Apparate, Bolzano-Bozen, Italy

[21] Appl. No.: 825,293

[22] Filed: Aug. 17, 1977

[30] Foreign Application Priority Data

Aug. 24, 1976 [IT] Italy .............................. 4846 A/76

[51] Int. Cl.² .......................................... G03B 27/76
[52] U.S. Cl. ............................................... 355/71
[58] Field of Search ............... 355/18, 32, 77, 35, 355/37, 30, 67–71

[56] References Cited

U.S. PATENT DOCUMENTS

| | | | |
|---|---|---|---|
| 1,097,211 | 5/1914 | Bechstein | 355/67 |
| 2,294,580 | 9/1942 | Skinner et al. | 355/30 |
| 2,530,843 | 11/1950 | Smith | 355/70 |
| 3,241,437 | 3/1966 | Thiels | 355/30 |
| 3,817,617 | 6/1974 | Weinert | 355/68 X |

FOREIGN PATENT DOCUMENTS 74054 11/1944 Czechoslovakia .......................... 355/71

*Primary Examiner*—Donald A. Griffin
*Attorney, Agent, or Firm*—Connolly and Hutz

[57] ABSTRACT

A light mixing compartment for a projector, such as incorporated in a photographic copier or enlarger, has four convexly curved side panels disposed between the entrance and exit, which are covered by light diffusing plates. The cross sections of the compartment parallel to its diffusing plates are cylindrical or rectangular with the sides having different angles of inclination adjacent the entrance from those at the exit. The ultimate slope of the sides adjacent the exit preferably is a right angle, and the overall shape of the convexly curved sides is adjusted to control the marginal brightness of the light format emitted from the compartment. The four convexly curved sides are held together by appropriately shaped bands riveted to the sides for securing them together.

6 Claims, 2 Drawing Figures

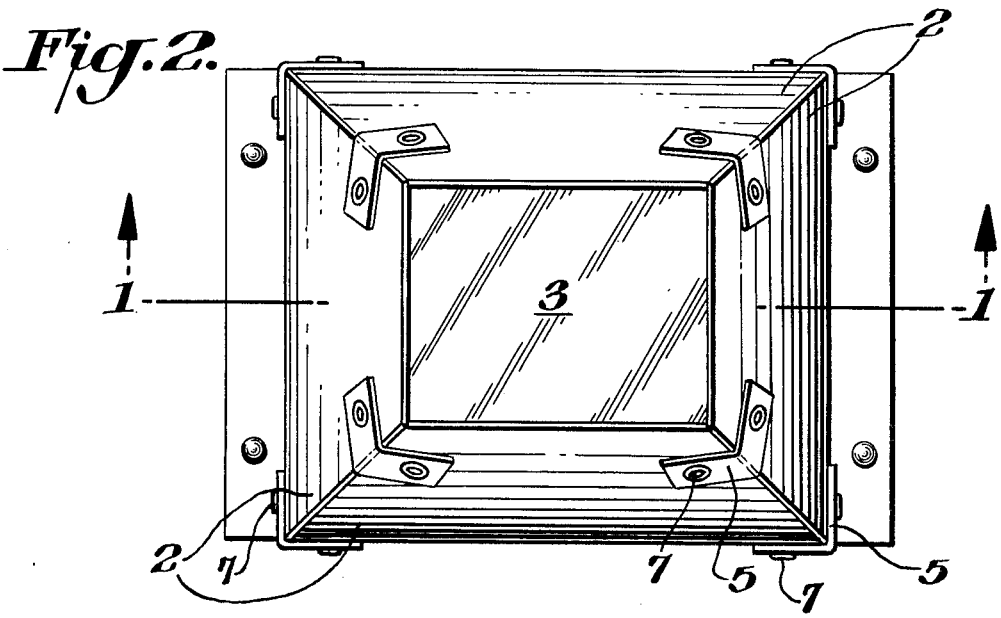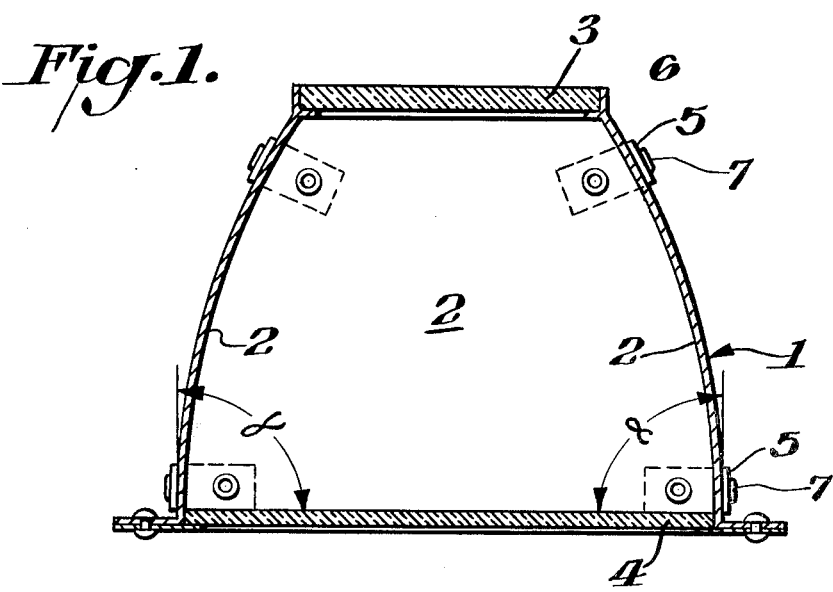

LIGHT-MIXING COMPARTMENT FOR A LIGHT PROJECTOR

BACKGROUND OF THE INVENTION

This invention relates to a light-mixing compartment for a photographic projector particularly for photographic copying or enlarging apparatus.

German Patent Application P 25 46 721.4, corresponding to U.S. Pat. No. 4,053,222 relates to illuminating equipment having a two-part light-mixing compartment in which the light admitting (first) portion is in the form of a truncated pyramid and the light-emerging (second) portion has the shape of a parallelepiped with side faces either disposed perpendicular to the light emerging area or with side faces inclined at a different angle from the inclination of the side faces of the first portion.

The inclination of the side faces of the light-mixing compartment controls the light distribution in the light-emerging area, so that it is possible to obtain an extremely uniform brightness distribution over the entire illuminating surface without the need for tapered diffusing screens, and it is also possible to utilize a diffusing screen over the light emerging area having a uniform thickness over its entire area.

The diffusing screen in the light emergence area of the light-mixing compartment equalizes the slight irregularities in the mixed and distributed light, which still remain even in the proposed illuminating equipment. To increase the light yield of illuminating equipment of the previously-mentioned type, the length of the light-mixing paths is maintained as short as possible and the thinnest possible diffusing screen or none at all is utilized.

If a thinner diffusing screen with a slighter diffusing effect is used, instead of the previously discussed diffusing screen at the light emergence area of the light-mixing compartment, this causes an intolerable contrast in brightness at the margins or edges of the illuminated format. It is, therefore, not possible to increase the light yield of the previously discussed illuminating equipment by reducing the diffusing effect in the light emergence area. An object of this invention is, therefore, to improve the light yield obtained from the aforementioned type of illuminating equipment by selecting a particular shape for the sides of the light mixing compartment.

SUMMARY

This invention accordingly uniquely provides a substantially uniform light-mixing effect with a much thinner diffusing screen having a substantially uniform light-diffusing effect over its light-emergence area. This is because the contrast in brightness resulting in the margins or edge areas from the particular reflecting conditions caused by the transition in inclination of the side faces from the first to the second portion of the previously-existing light-mixing compartment no longer occur. A diffusing screen with a slighter diffusing effect may, therefore, be utilized, which leaves the quality and distribution of the light mixture substantially unaffected so long as the length of the light-mixing paths remains constant.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a side view in elevation taken through FIG. 2 along the line 1—1; and

FIG. 2 is a top plan view of a light-mixing compartment which is one embodiment of this invention.

DESCRIPTION OF THE PREFERRED EMBODIMENT

An illuminating device for a photographic enlarger (whose details are not described) includes above its negative plane, wherein the image original is to be projected, a light-mixing compartment 1. Compartment 1 is comprised of four convex side parts 2 connected together by bands 5. A diffusing screen 3 is mounted in a frame 6 on the light-entering side of compartment 1 and another diffusing screen 4 is mounted on the light emergence side of mixing compartment 1. Four side parts 2 are convexly curved and, for example, form substantially rectangular cross sections disposed parallel to the diffusing screens. The portions of side parts 2 adjacent light emergence diffuser 4 are disposed, for example, at right angles to light diffuser 4. Side parts 2, form cylindrical cross sections for light-mixing compartment 2, which permit a particularly inexpensive light-mixing compartment to be made of coordinately shaped sheet metal parts. The convexly curved cylindrical parts are curved in such a manner to provide a closed connection between the four individual side parts 2, thus forming a closed compartment 1. The four parts forming the sides of light-mixing compartment 1 are secured together by riveted joints 7 through bands 5 as shown in the drawings. This form of assembly also provides a simple and inexpensive form of manufacture. The interior of light-mixing compartment 1 is preferably a reflecting or mirrored surface made, for example, by using a reflecting inner surface on sheet metal. The inner surfaces may also be fully or partially diffusing in nature, which may be provided by correspondingly treating the material for light-mixing compartment 1.

The transparent original copy to be illuminated is disposed adjacent the light emergence plane covered by diffusing screen 4. This is not illustrated nor is illustrated the projection region disposed therebelow.

A copying light source (also not shown) is disposed above diffusing screen 3. Color filters (also not shown) may be inserted between the light source and diffusing screen 3 into the path of light emanating from the light source. Further light-conducting and/or mixing means also may be disposed in the path of the light rays emanating from the source.

The convexly curved or arched side parts 2 have a curvature depending on the light requirements existing in the light entrance area, on the shape and extent of the side parts, on the length of the light-mixing compartment and on the shape and extent of the light-emergence area as well as on the brightness distribution required at the light emergence area. The incline of the arched side faces adjacent the light emergence plane is particularly important in this connection. This incline is designated by the angle $\alpha$ between the light emergence plane and the tangent to the side face at the point of intersection with the light emergence surface. This is because the brightness of the marginal zones of the illuminated format is directly influenced by such incline as compared to the brightness of the central zone of the format.

As the angle $\alpha$ becomes larger relative to an exemplary initial position, the marginal zones become brighter relative to those provided by such an initial position. The reverse occur with a decrease in the angle α causing the marginal zones compared to those obtained from the initial position becoming less brightly illuminated.

By suitably selecting angle α within certain limits the marginal brightness of the projected format may be prevented from decreasing to any appreciable extent.

A particularly useful angle α ranges, for example, from 75° to 105°, more particular from 85° to 95°. A particularly effective example is, for example 89° to 91°.

I claim:

1. A light-mixing compartment for a photographic color printing apparatus having a light entrance and light emergence sections comprising a plurality of externally convexly curved internally reflective side sections connecting the light emergence to the light entrance sections, a light diffusing screen is disposed adjacent the light emergence section of the compartment, the convexly curved side sections having an angle of curvature, and the angle between a tangent to the portion of the side section disposed adjacent the light emergence section ranges from about 75° to 105° whereby the quality and distribution of the light mixture is substantially uniform, the cross-sectional area of the compartment increasing from light entrance to light emergence sections.

2. A light-mixing compartment for a photographic color printing apparatus having a light entrance and light emergence sections comprising a plurality of externally convexly curved internally reflective side sections connecting the light emergence to the light entrance sections, a light diffusing screen is disposed adjacent the light emergence section of the compartment, the convexly curved side sections having an angle of curvature, and the angle between a tangent to the portion of the side section disposed adjacent the light emergence section ranges from about 85° to 95° whereby the quality and distribution of the light mixture is substantially uniform, the cross-sectional area of the compartment increasing from light entrance to light emergence sections.

3. A light-mixing compartment for a photographic color printing apparatus having a light entrance and light emergence sections comprising a plurality of externally convexly curved internally reflective side sections connecting the light emergence to the light entrance sections, a light diffusing screen is disposed adjacent the light emergence section of the compartment, the convexly curved side sections having an angle of curvature, and the angle between a tangent to the portion of the side section disposed adjacent the light emergence section is about 89° to 91° whereby the quality and distribution of the light mixture is substantially uniform, the cross-sectional area of the compartment increasing from light entrance to light emergence sections.

4. A light-mixing compartment for a photographic color printing apparatus having light entrance and light emergence sections comprising a plurality of externally convexly curved internally reflective side sections connecting the light emergence to the light entrance sections, a light-diffusing screen is disposed adjacent the light emergence section of the compartment, the light-diffusing screen being relatively thin whereby a light discontinuity would ordinarily result therefrom, and the convexly curved side sections having an angle of curvature whereby the quality and distribution of the light mixture is maintained substantially uniform, and the angle between a tangent to the portion of the side section disposed adjacent the light emergence section ranges from about 75° to 105°.

5. A light-mixing compartment for a photographic color printing apparatus having a light entrance and light emergence sections comprising a plurality of externally convexly curved internally reflective side sections connecting the light emergence to the light entrance sections, a light-diffusing screen is disposed adjacent the light emergence section of the compartment, the light-diffusing screen being relatively thin whereby a light discontinuity would ordinarily result therefrom, and the convexly curved side sections having an angle of curvature whereby the quality and distribution of the light mixture is maintained substantially uniform and the angle between a tangent to the portion of the side section disposed adjacent the light emergence section ranges from about 85° to 95°.

6. A light-mixing compartment for a photographic color printing apparatus having light entrance and light emergence sections comprising a plurality of externally convexly curved internally reflective side sections connecting the light emergence to the light entrance sections, a light-diffusing screen is disposed adjacent the light emergence section of the compartment, the light-diffusing screen being relatively thin whereby a light discontinuity would ordinarily result therefrom, and the convexly curved side sections having an angle of curvature whereby the quality and distribution of the light mixture is maintained substantially uniform, and the angle between a tangent to the portion of the side section disposed adjacent the light emergence section is about 89° to 91°.

* * * * *